United States Patent
Nyhuis et al.

(10) Patent No.: US 10,999,306 B2
(45) Date of Patent: May 4, 2021

(54) SECURE DIGITAL TRAFFIC ANALYSIS

(71) Applicant: Vigilant IP Holdings LLC, Liberty Township, OH (US)

(72) Inventors: Christopher M. Nyhuis, Liberty Township, OH (US); Michael Pananen, Lebanon, OH (US)

(73) Assignee: Vigilant IP Holdings LLC, Liberty Township, OH (US)

( * ) Notice: Subject to any disclaimer, the term of this patent is extended or adjusted under 35 U.S.C. 154(b) by 0 days.

(21) Appl. No.: 16/778,435

(22) Filed: Jan. 31, 2020

(65) Prior Publication Data

US 2020/0177607 A1 Jun. 4, 2020

Related U.S. Application Data

(62) Division of application No. 15/861,175, filed on Jan. 3, 2018, which is a division of application No. (Continued)

(51) Int. Cl.
*G06F 11/30* (2006.01)
*H04L 29/06* (2006.01)
(Continued)

(52) U.S. Cl.
CPC .......... *H04L 63/1425* (2013.01); *G06F 21/53* (2013.01); *H04L 9/3236* (2013.01);
(Continued)

(58) Field of Classification Search
CPC .... H04L 9/3239; H04L 63/20; G06F 11/1417; G06F 11/167; G06F 16/137; G06F 21/44; G06F 21/57; G06F 21/572
See application file for complete search history.

(56) References Cited

U.S. PATENT DOCUMENTS 6,463,537 B1 10/2002 Tello
7,222,233 B1 5/2007 Rubin
(Continued)

OTHER PUBLICATIONS

Seshadri et al., SWATT: Software-based Attestation for Embedded Devcies, IEEE Symposium on Security and Privacy, 2004, pp. 1-11.*
(Continued)

*Primary Examiner* — Farid Homayounmehr
*Assistant Examiner* — Lizbeth Torres-Diaz
(74) *Attorney, Agent, or Firm* — Frost Brown Todd LLC

(57) ABSTRACT

A network monitoring "sensor" is built on initial startup by checking the integrity of the bootstrap system and, if it passes, downloading information from which it builds the full system including an encrypted and an unencrypted portion. Later, the sensor sends hashes of files, configurations, and other local information to a data center, which compares the hashes to hashes of known-good versions. If they match, the data center returns information (e.g., a key) that the sensor can use to access the encrypted storage. If they don't, the data center returns information to help remediate the problem, a command to restore some or all of the sensor's programming and data, or a command to wipe the encrypted storage. The encrypted storage stores algorithms and other data for processing information captured from a network, plus the captured/processed data itself.

5 Claims, 4 Drawing Sheets

Related U.S. Application Data

14/866,834, filed on Sep. 25, 2015, now Pat. No. 10,277,616.

(60) Provisional application No. 62/055,043, filed on Sep. 25, 2014.

(51) Int. Cl.
    *G06F 21/53* (2013.01)
    *H04L 9/32* (2006.01)

(52) U.S. Cl.
    CPC ...... *H04L 63/0428* (2013.01); *H04L 63/0876* (2013.01); *H04L 63/1416* (2013.01)

(56) References Cited

U.S. PATENT DOCUMENTS

| | | | |
|---|---|---|---|
| 8,494,170 B2 * | 7/2013 | Kahler | H04L 9/083 380/286 |
| 8,561,204 B1 | 10/2013 | Dalcher | |
| 8,646,060 B1 * | 2/2014 | Ben Ayed | H04L 63/205 726/9 |
| 9,832,024 B2 * | 11/2017 | Xu | H04L 9/3247 |
| 10,277,616 B2 * | 4/2019 | Nyhuis | H04L 63/0876 |
| 2003/0084275 A1 | 5/2003 | David et al. | |
| 2004/0153672 A1 * | 8/2004 | Watt | G06F 9/30123 726/22 |
| 2005/0138346 A1 * | 6/2005 | Cauthron | G06F 9/4416 713/2 |
| 2006/0230443 A1 * | 10/2006 | Yim | H04L 63/1416 726/12 |
| 2006/0272027 A1 * | 11/2006 | Noble | H04L 9/32 726/27 |
| 2009/0319473 A1 * | 12/2009 | Rao | G06F 16/9014 |
| 2010/0091676 A1 | 4/2010 | Moran et al. | |
| 2011/0087920 A1 | 4/2011 | Hendricks et al. | |
| 2011/0113230 A1 * | 5/2011 | Kaminsky | G07F 17/3223 713/2 |
| 2013/0152047 A1 * | 6/2013 | Moorthi | G06F 11/368 717/124 |
| 2013/0347103 A1 * | 12/2013 | Veteikis | H04L 43/04 726/22 |
| 2014/0222899 A1 | 8/2014 | Supramaniam et al. | |
| 2014/0310510 A1 * | 10/2014 | Potlapally | G06F 9/4401 713/2 |
| 2014/0331087 A1 * | 11/2014 | Resch | G06F 16/13 714/19 |
| 2015/0006912 A1 | 1/2015 | Mansi et al. | |
| 2015/0200934 A1 * | 7/2015 | Naguib | G06F 21/575 713/2 |
| 2015/0281260 A1 | 10/2015 | Arcamone et al. | |
| 2016/0028725 A1 | 1/2016 | Benoit et al. | |
| 2016/0191558 A1 | 6/2016 | Davison | |
| 2016/0232343 A1 * | 8/2016 | Post | G06F 9/4401 |
| 2016/0248655 A1 | 8/2016 | Francisco et al. | |
| 2016/0359872 A1 | 12/2016 | Yadav et al. | |
| 2017/0346807 A1 * | 11/2017 | Blasi | G06F 21/33 |
| 2017/0353313 A1 | 12/2017 | Goldman | |
| 2018/0123804 A1 | 5/2018 | Smith et al. | |
| 2018/0124088 A1 * | 5/2018 | Nyhuis | H04L 63/1425 |
| 2018/0124089 A1 | 5/2018 | Nyhuis et al. | |
| 2019/0199751 A1 | 6/2019 | Lipman et al. | |
| 2019/0288847 A1 | 9/2019 | Beckmann et al. | |
| 2019/0319942 A1 * | 10/2019 | Blasi | G06F 21/105 |
| 2019/0325137 A1 | 10/2019 | Itkin | |
| 2019/0349426 A1 | 11/2019 | Smith et al. | |
| 2020/0177607 A1 | 6/2020 | Nyhuis et al. | |
| 2020/0228556 A1 * | 7/2020 | Nyhuis | H04L 63/0876 |

OTHER PUBLICATIONS

Harris et al., StaticTrust: A Practical Framework for Trusted Networked Devices, 44th Hawaii International Conference on System Sciences, 2011, pp. 1-10.*

Sechadri et al., SWATT: Software-based ATTestation for Embedded Devices, IEEE Symposium on Security and Privacy, 2004, pp. 1-11.

U.S. Appl. No. 16/778,396, entitled "Secure Digital Traffic Analysis," filed Jan. 31, 2020.

U.S. Pat. No. 10,277,616. Apr. 2019, Nyhuis, et al.

* cited by examiner

SECURE DIGITAL TRAFFIC ANALYSIS

REFERENCE TO RELATED APPLICATIONS

This application claims priority to and is a divisional of U.S. patent application Ser. No. 15/861,175, filed Jan. 3, 2018, with the title "Secure Digital Traffic Analysis," which itself is a divisional of U.S. patent application Ser. No. 14/866,834, filed Sep. 25, 2015, with title "Secure Digital Traffic Analysis," which itself is a nonprovisional of U.S. Provisional Application 62/055,043, filed Sep. 25, 2014, with title "Distributed Computer Security Platform."

FIELD

The present invention relates to electric digital data processing. More specifically, the present invention relates to protecting data and monitoring users, programs or devices to maintain the integrity of platforms.

BACKGROUND

In the arms race that is computer security, malware writers and computer security professionals are continuously working to improve their techniques for stealing information and protecting it, respectively. Any network-connected computer might be vulnerable to attack from other devices on the network, so there is always a need for improved computer security techniques and devices.

DESCRIPTION

Figure 1:
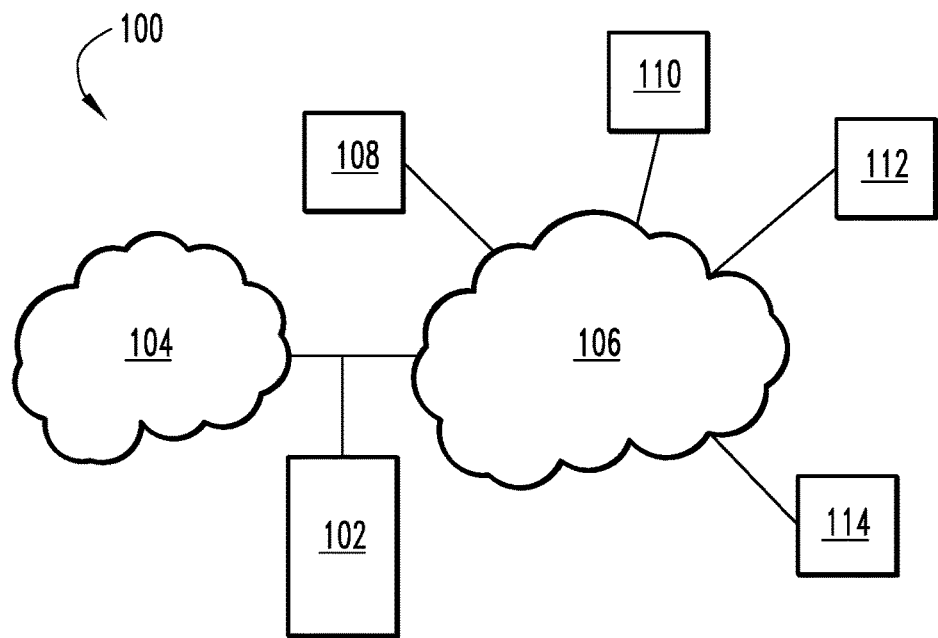
FIG. 1 is a schematic diagram of a system implementing an embodiment of the inventive system.

For the purpose of promoting an understanding of the principles of the present invention, reference will now be made to the embodiments illustrated in the drawings, and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art.

Generally, one form of the present system is a data network monitoring device (called a "sensor" in this description) that is physically installed with one or more taps on a data network, retrieves build information from a secure source (such as an authenticated server, FTP server at a known IP address, or other sufficiently authoritative source for a particular implementation as will occur to those skilled in the art), and builds itself (i.e., prepares and/or installs its operational components) in situ using one or more file manipulation tools, compilers, automated parsing engines, or the like as will occur to those skilled in the art. Upon successfully booting post-build, the sensor mounts an encrypted storage volume, monitors data traffic at the tap, stores observed data on the encrypted volume, analyzes observed data, and saves the analytics on the encrypted volume, too. The sensor generates alarms when appropriate, monitors its own "health" (secure state), recovers from attack, and implements a "self-destruct" function that can be triggered remotely. Suspicious traffic is run through a variety of filters and/or analyzed by human analysts. Each of these components, functions, and operations is discussed further herein.

With reference to FIG. 1, example system 100 includes a sensor 102 connected via a tap to the connection between subnet 104 and a data communications network 106, such as the Internet. In this example, configuration server 108 is also connected to data network 106, as are collection repository 110, data center 112, and analyst center 114, each of which will be discussed in further detail. In other embodiments, configuration server 108, collection repository 110, data center 112, and analyst center 114 are combined in a single facility in communication with data communications network 106. In still other embodiments, configuration server 108, collection repository 110, data center 112, and analyst center 114 are situated in two or more locations on data communications network 106, such as different subnets. In this embodiment, when sensor 102 is installed, it is physically connected so that it has access to all traffic passing between subnet 104 and network 106 using wired or wireless data capture. In alternative embodiments, sensor 102 is positioned as a bridge between networks, while in others, sensor 102 is connected to one particular network and monitors communications on that network as described herein.

Figure 2:
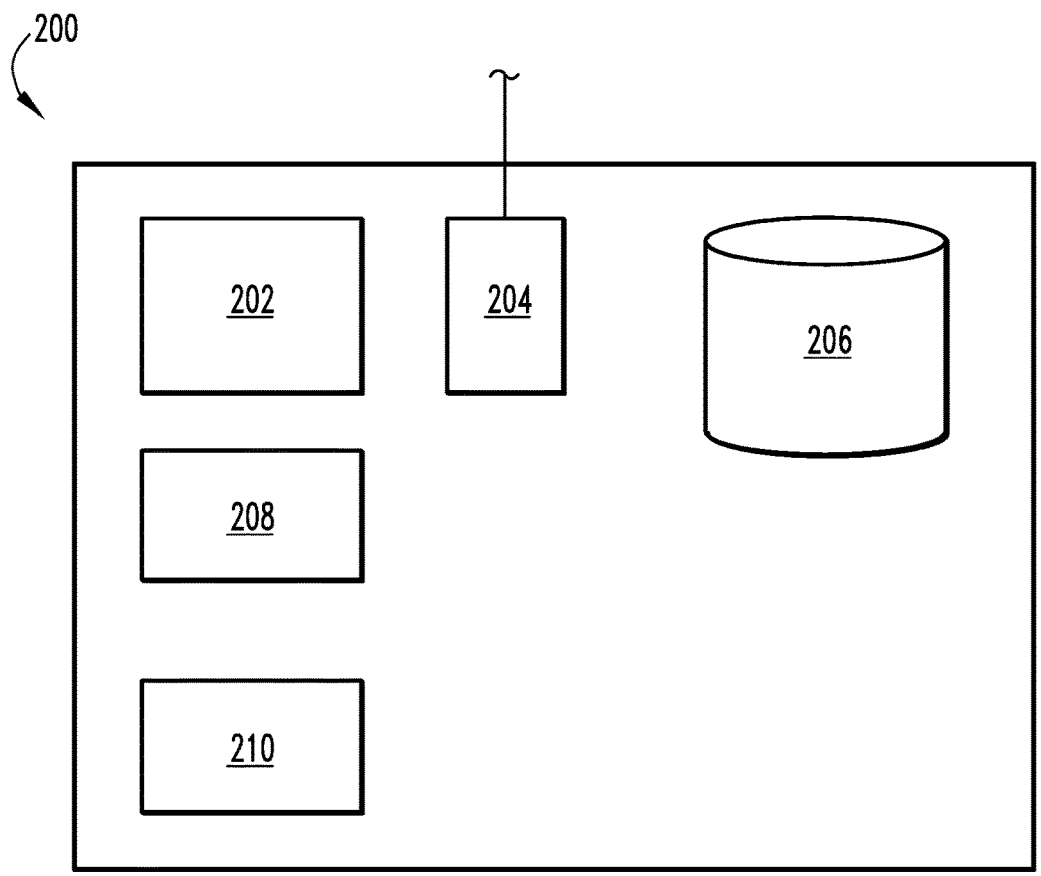
FIG. 2 is a functional block diagram of a sensor in the embodiment of FIG. 1.
Figure 3:
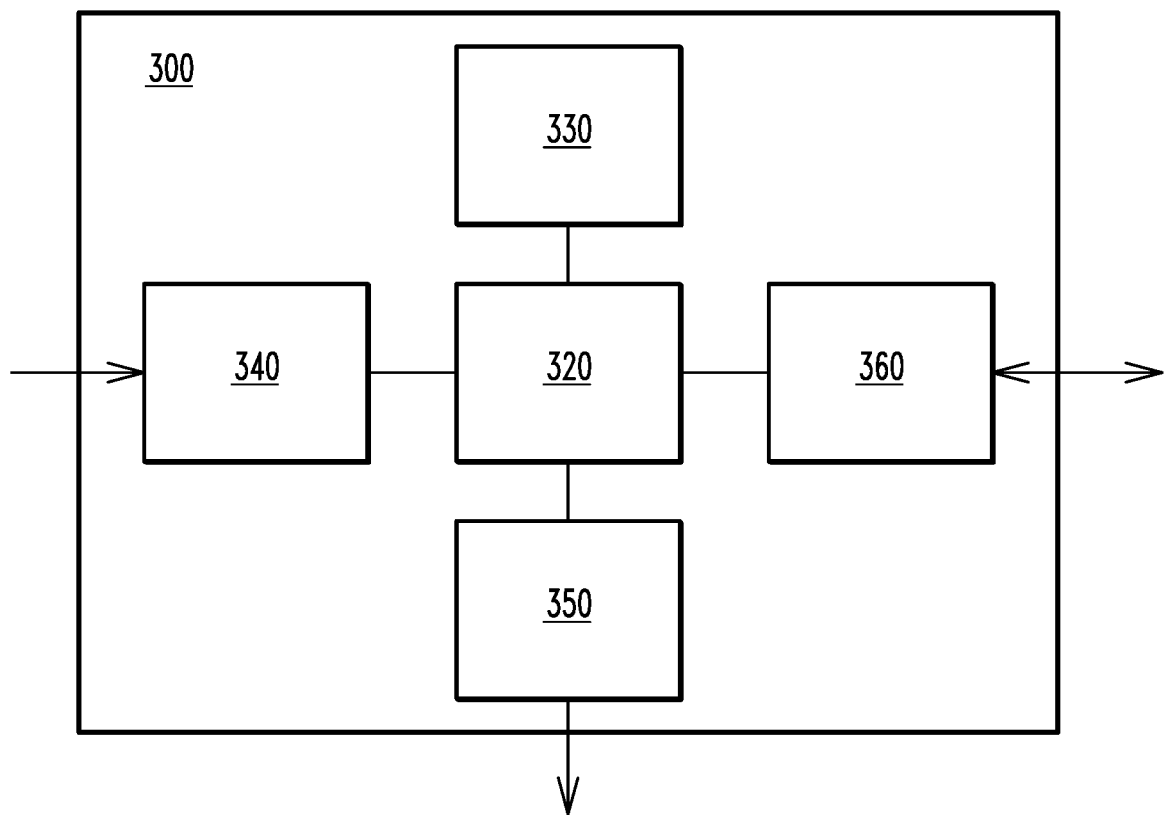
FIG. 3 is a schematic diagram of a computing resource used in various embodiments.
Figure 4:
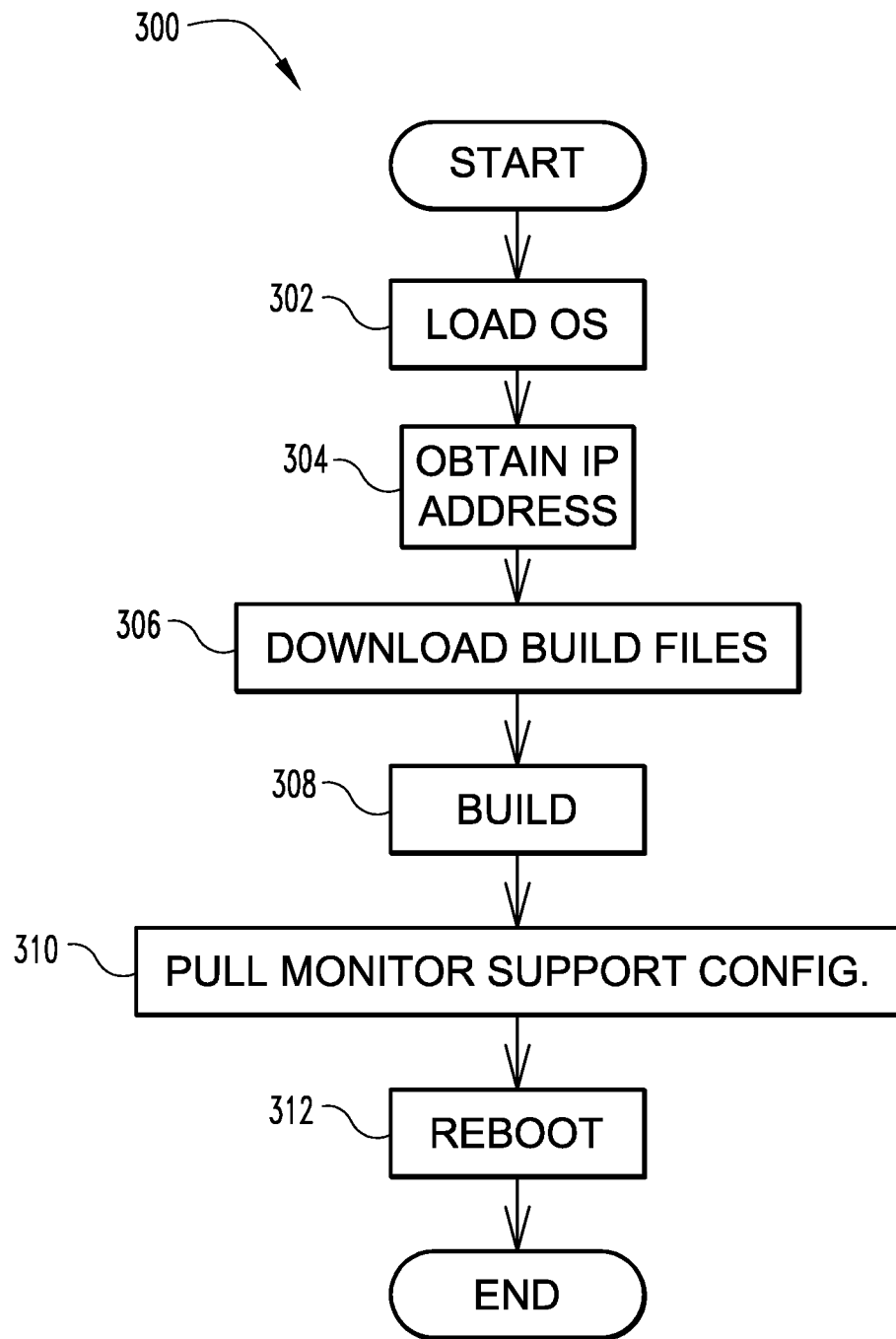
FIG. 4 is a flowchart of a boot-up sequence of a sensor for use in the embodiment of FIG. 1.

The initial boot up process 300 for sensor 102 with reference to FIG. 3, with continuing reference to FIG. 1 and additional reference to the exemplary embodiment 200 of sensor 102 illustrated in FIG. 2, when sensor 102 is first powered up, bootstrap platform 202 (also known as the "base system") loads (302) an operating system, such as a custom build of CentOS, from local memory. Of course, other operating systems such as other variants of Linux, Windows, QNX, iOS and Android can be used in other implementations as will occur to those skilled in the art.

Exemplary sensor 200 then obtains (304) an IP address for the one or more network taps 204 from a DHCP server on subnet 104. In other embodiments, the IP address for exemplary sensor 200 is preconfigured (e.g., fixed during a configuration process or at initial boot), while in still others it is assigned using other techniques as will occur to those skilled in the art. Sensor 200 then communicates with configuration server 108 using an automation tool such as Puppet (see http://puppetlabs.com/puppet/puppet-open-source). Of course, other automation and/or synchronization tools could be used as will occur to those skilled in the art. Sensor 200 downloads (306) files and instructions for building itself from the base system 202 into fully operational sensor 200, then executes (308) them. Intelligence, algorithms, signatures, and sensor profile data are pulled (310) from configuration server 108 and stored in encrypted storage 206. When the build is complete, sensor 200 is rebooted (312) to begin monitoring traffic received through network taps 204.

Figure 5:
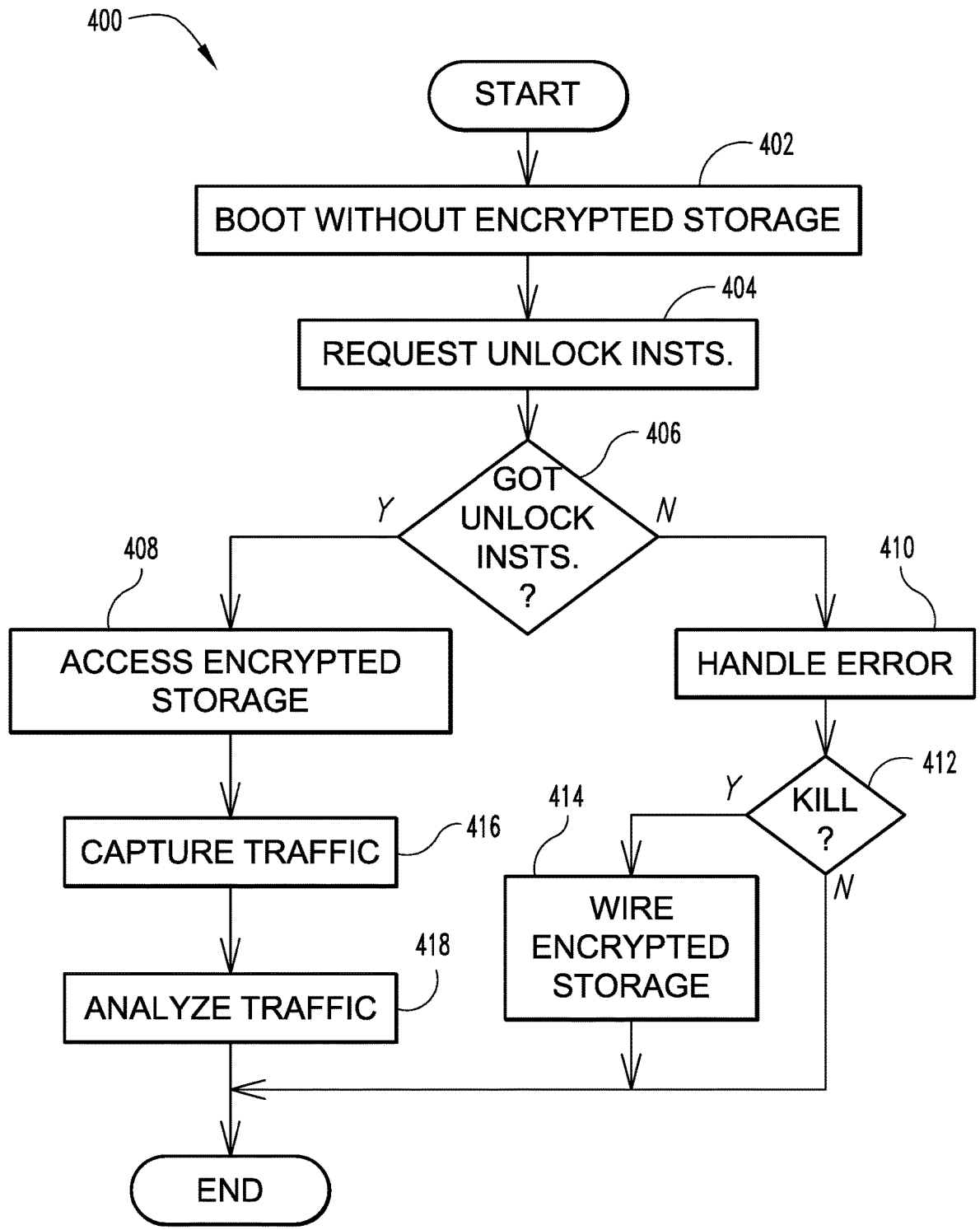
FIG. 5 is a flowchart of operation of a sensor for use in the embodiment of FIG. 1.

Normal operation (400) of sensor 200 will now be described with reference to FIG. 5 and continuing reference to FIGS. 1 and 2. Encrypted storage 206 in the present embodiment comprises an encrypted drive partition in sensor 200 that, as sensor 200 is booted (402), remains unmounted and not visible to bootstrap platform 202 and other subsystems operating in sensor 200. During the boot process, validity check programming of sensor 200 communicates (404) through automation tools with data center 112 and requests instructions (406) whether (and, in some embodiments, how (e.g., instructions and/or cryptographic key material or information from which sensor 200 can derive key material)) to access encrypted storage 206 and continue booting and/or operating. For example, in some embodiments, unlocking code in base system 202 and/or unlocking information downloaded from data center 112 or configuration server 108 may include decryption key information received from one of those remote systems and use (408) the key to access encrypted storage 206. In "split-key" embodiments, sensor 200 stores information locally that the unlocking code must combine with other unlocking information downloaded from one of the remote servers to produce the key for accessing encrypted storage 206. In other embodiments, when the system 202 wants to mount encrypted storage 206, the unlocking code has to retrieve at least part of the executable code from a remote source. In still other embodiments, access to encrypted storage 206 is performed by the unlocking instructions as a function of information retrieved from the remote source in other ways as will occur to those skilled in the art.

If sensor 200 does not receive that instruction, or for some reason sensor 200 is unable to communicate with data center 112, sensor 200 executes error-handling code (410), does not mount encrypted storage 206, and remains a "base system" without customized features, intelligence, algorithms, and sensor data history. For example, if sensor 200 were stolen and started up in a different location on the Internet—or completely disconnected from the Internet—this lockout prevents the thief from getting information from encrypted storage 206 or learning how the sensor 200 operates. In some embodiments, sensor 200 then listens (412) for a "kill" command from data center 112 or analyst center 114 and, if such a command is received, wipes (414) encrypted storage 206 with government-grade wiping protocols and/or other techniques as will occur to those skilled in the art. Even if the thief were to detect a missing mounted drive, if they attempted to mount the drive, sensor 200 would self-destruct and execute the "kill" command.

The validity check programming of sensor 200 may take different forms in different embodiments, but generally determines whether the unencrypted storage is in a secure state (that is, a state where, to an extent appropriate for the context, sensor 200 has collected enough information to be sufficiently confident that its state is fully operational, not tampered with, not subject to virus or other malware activity, and neither intentionally or unintentionally corrupted). In some embodiments, the validity check programming sends data from sensor 200 to data center 112 for analysis, while in others the validity check programming creates hashes of files and other information, sending just the hashes to data center 112. Other validity check techniques may be used as will occur to those skilled in the art. In various embodiments, validity check programming runs at boot time, on a periodic basis, at random times, when triggered by an action or attempt to take an action, upon receiving a (preferably authenticated) command, at other times, or at more than one of these times, as will occur to those skilled in the art.

In the present embodiment, each file stored in sensor 200's non-volatile memory is hashed to create an identifying fingerprint of that file. In various embodiments, various components of the system 100 use hash functions SHA-1, SHA-256, MD-4, MD-5, RIPEMD, or another hash function as will occur to those skilled in the art. The hash of the correct version(s) of each file is stored in data center 112, and sensor 200 periodically sends current hashes of its files back to data center 112, which compares those live hashes with the previously stored, correct hashes. In various embodiments, this process includes hashes of a variety of data elements, such as all files, user accounts, local passwords, directory listings, software manifests, configuration options, or some combination thereof so that any changes an attacker might make are detected in this periodic self-check. In some embodiments, data center 112 maintains "known good" hashes of files and configuration data associated with each of a plurality of sensors, and when a particular sensor 200 contacts data center 112 to validate its state, sensor 200 includes information sufficient to determine its identity so that data center 112 can match the request with the correct set of file hashes, configuration data, etc. In various embodiments, the identity information comprises a serial number for sensor 200, a serial number associated with a particular installation, a cryptographic signature that authenticates a particular sensor 200, or other information or technique as will occur to those skilled in the art. In each of these embodiments, data center 112 accepts the requests from the one or more sensors 200 by listening on one or more ports for data transmissions that are parsed into the information needed to check the validity of the data from which the hash was made, though in other embodiments the accepting and receipt of requests will take analogous forms as will occur to those skilled in the art.

If changes are detected, the system returns itself to its previous "correct" state by restoring a snapshot, downloading correct versions of the modified files and/or configurations (and overwriting the "incorrect" versions), and other steps that will occur to those skilled in the art. When these files and settings are restored, the attacker's access is typically removed along with any damage they have caused, and the sensor 200 contacts data center 112 and/or analyst center 114 to report the event.

In the illustrated embodiment of sensor 200, if data center 112 detects that sensor 200 has been compromised, system operators at analyst center 114 can issue a kill command to the sensor 200. Upon receiving the kill command, sensor 200 unmounts encrypted storage 206 and securely wipes the associated storage space. In some embodiments, sensor 200 automatically engages this "kill" process if it cannot reach data center 112 to "check in" over a particular period of time.

When this illustrated embodiment of sensor 200 is operating, traffic captured (416) at taps 204 is allowed to pass between subnet 104 and network 106 without degradation of service or speed, but a copy of the captured traffic is processed (418) by analysis engine 208 of sensor 200. Analysis engine 208 (at certain times or under certain conditions, in some embodiments) records a full packet capture of the network data in encrypted storage 206, but also analyzes its content. For example, analysis engine 208 checks the traffic for specific types of connections, including, for example, those for HTTP, SSH, DNS, and the like, and the connections requested and/or made in the traffic are compared to the intelligence previously pulled from configuration server 108. In various embodiments, analysis engine 208 compares the traffic to patterns and heuristics of known attacks, expected traffic and particular risks associated with the given client (from a "client profile"), expected traffic in particular risks associated with the client's industry (from an "industry profile"), and the like. When attacks are found, they are flagged, and one or more responses and/or remediation techniques may be implemented depending on the configuration of sensor 200. In various implementations, "flagging" takes the form of storing the relevant portion of data in encrypted storage 206, saving a data record describing the event in encrypted storage 206, informing data center 112 about the event, alerting one or more individuals at analyst center 114, and other actions as will occur to those skilled in the art.

In addition, if an HTTP or other connection is known to be bad or is suspicious, either sensor 200 or data center 112 (after receiving the parameters and/or content of the connection from sensor 200) opens it in a sandbox 210 (illustrated here as part of sensor 200, though other implementations will occur to those skilled in the art) wherein all actions of the webpage are executed in a protected environment. That sandbox 210 is monitored for intelligence as to what the suspicious/malicious content does, including without limitation network resources that the content accesses, scripts it executes, directories and files it tries to access, applications it tries to open, configuration data it tries to change, and other activities as will occur to those skilled in the art. If the sandbox 210 is local to sensor 200, this intelligence is recorded in encrypted storage 206 and communicated (either at that time or at a later time) to collection repository 100.

Further, analysis engine 208 runs some or all of the captured content through one or more signature-based comparison engines (such as Yara) to compare the traffic with one or more threat databases (such as VirusTotal) in real time. Of course, alternative comparison engines, techniques, and databases will be used in alternative embodiments as will occur to those skilled in the art.

When analysis engine 208 finds a match or detects suspicious traffic/connection/content, any of a variety of actions are taken depending on the system configuration. For example, a malicious or suspicious web link, image, script, executable file, or the like may be rendered, interpreted, or executed in sandbox 210 local to sensor 200 or at data center 112. Sensor 200 or data center 112 may send meta-information about the traffic/connection/content, the content itself, and/or telemetry regarding the rendering/interpretation/execution to collection repository 110. Sensor 200 or data center 112 may also automatically notify one or more administrators of system 100, as well as representatives and technical personnel responsible more directly for administration of subnet 104. Sensor 200 or data center 112 may also notify one or more human analysts at analyst center 114 and give them information about the situation so they can subject it to further analysis. The human analysts view information about the traffic/connection/content on computing devices in analyst center 114 and perform additional analysis of—and direct remediation in response to—the incident.

In various embodiments, taps 204 capture traffic between subnet 104 and network 106 as described above, but operate independently of sensor 102. In such embodiments, taps 204 may be internal or external to sensor 102, but enable data to pass between subnet 104 and network 106 even when sensor 102 is powered down.

In some embodiments of the system described herein, the computing resources/devices that are applied generally take the form of a mobile, laptop, desktop, or server-type computer, as mentioned above and as will occur to those skilled in the art. The "computer" 300, as this example will generically be referred to with reference to FIG. 3, includes a processor 320 in communication with a memory 330, input interface(s) 340, output interface(s) 350, and network interface 360. Memory 330 stores a variety of data, but is also encoded with programming instructions executable to perform the functions described herein. Power, ground, clock, and other signals and circuitry (not shown) are used as appropriate as will be understood and easily implemented by those skilled in the art.

The network interface 360 connects the computer 300 to a data network 370 for communication of data between the computer 300 and other devices attached to the network 370. Input interface(s) 340 manage communication between the processor 320 and one or more touch screens, sensors, push-buttons, UARTs, IR and/or RF receivers or transceivers, decoders, or other devices, as well as traditional keyboard and mouse devices. Output interface(s) 350 provide a video signal to a display 380, and may provide signals to one or more additional output devices such as LEDs, LCDs, or audio output devices, local multimedia devices, local notification devices, or a combination of these and other output devices and techniques as will occur to those skilled in the art.

The processor 320 in some embodiments is a microcontroller or general purpose microprocessor that reads its program from the memory 330. The processor 320 may be comprised of one or more components configured as a single unit. Alternatively, when of a multi-component form, the processor may have one or more components located remotely relative to the others. One or more components of the processor may be of the electronic variety including digital circuitry, analog circuitry, or both. In some embodiments, the processor is of a conventional, integrated circuit microprocessor arrangement, such as one or more CORE i3, i5, or i7 processors from INTEL Corporation of 2200 Mission College Boulevard, Santa Clara, Calif. 95052, USA, or OPTERON or PHENOM processors from Advanced Micro Devices, One AMD Place, Sunnyvale, Calif. 94088, USA. In alternative embodiments, one or more reduced instruction set computer (RISC) processors, application-specific integrated circuits (ASICs), general-purpose microprocessors, programmable logic arrays, or other devices may be used alone or in combinations as will occur to those skilled in the art.

Likewise, the memory 330 in various embodiments includes one or more types such as solid-state electronic memory, magnetic memory, or optical memory, just to name a few. By way of non-limiting example, the memory 330 can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; a solid-state or hybrid drive; or a plurality and/or combination of these memory types. Also, the memory in various embodiments is volatile, nonvolatile, or a hybrid combination of volatile and nonvolatile varieties.

Computer programs implementing the methods described herein will commonly be stored and/or distributed either on a physical distribution medium such as CD-ROM, or via a network distribution medium such as an internet protocol or token ring network, using other media, or through some combination of such distribution media. From there, they will often be copied to a hard disk, non-volatile memory, or a similar intermediate storage medium. When the programs are to be run, they are loaded either from their distribution medium or their intermediate storage medium into the execution memory of the computer, configuring the computer to act in accordance with the method described herein. All of these operations are well known to those skilled in the art of computer systems.

Each sensor 200 calculates bandwidth on each monitored link by calculating the aggregate bandwidth over a particular (e.g., 4000 ms) time frame, pulls load on the link, and displays that to the customer. Bandwidth is factored into evaluations of the overall threat landscape by allowing an analyst to compare it with the additional logs pulled via other sensor operations. The net usage software of sensor 200 also checks to verify that sensor operations are functioning, e.g., anomaly, heuristic, and signature detection tools.

As files are downloaded across the network 106 and are verified by the sensor 200:
1. The sensor 200 begins to create file hashes for every known file.
2. The sensor 200 matches the files to an intelligence list of known bad or malicious files.
3. Sensor 200 runs all files against a "known good" file list to determine whether the file is safe. A white list of files is derived from previous analysis of all files on a network, e.g., driver files, applications, documents, etc. Analysts pull this from network flow and put it into a repository where the file is tagged and classified for comparisons on the sensor.

In some variations of the disclosed systems, additional data captured from the network is correlated with stored intelligence for other purposes. In some of these embodiments, a client-side application runs on an endpoint device (not shown) on a protected subnet (such as subnet 104 shown in FIG. 1) verifying attacks against that device through signature-based detection. The client also has a client-side firewall, host-based intrusion detection, host-based intrusion prevention, content filtering, attack logging and optional full-disk encryption. The client communicates captured information back to data center 112 for additional and/or new threat signatures as well as reporting any active or detected threats. Signatures at data center 112 are derived from both logging on the endpoint device as well as any threat information derived from the network detection described elsewhere herein. In embodiments where a service provider serves a plurality of endpoint devices and sensors, signatures from global intelligence and other threat detection locations that the service provider might have a relationship with are sent to the endpoint devices. In some of these embodiments, all threat data from the endpoints is correlated with threat data detected on the customer network as well as with overall threat data and network compromises across every customer the service provider has to give full visibility into minute attacks and threat vectors. Threat information is made available to the service provider's customers through a customer portal. If threats are detected, the service provider provides full remediation to the affected customer.

With a standard security information and event management (SIEM) solution, the data cannot be fully trusted as an attacker could modify the logging capability of the sending device and thus limit the visibility that the SIEM solution has. In some embodiments, a device is placed on a client network that collects logs from other devices on the client network, and a separate device or service provider correlates that data with fully trusted network-collected data and verified endpoint-collected data to verify the validity and notice anomalies in the SIEM data. This allows the system to add higher fidelity to the SIEM data and notice when abnormalities appear in the collected information.

In some embodiments, outbound DNS on some client networks (such as subnet 104 in FIG. 1) can be pointed to a service provider's external DNS servers, thereby allowing for active blocking of selected outbound traffic based on DNS hostnames. In some of these embodiments, the service provider blocks explicit sites as well as known threat sites and locations for which customer traffic is bound. Analysts at analyst center 114 can add blocks in real time as undesirable content is found on its various customers' networks through network detection capabilities in the various elements of the disclosed system.

In still other embodiments, a service provider provides active vulnerability monitoring to a customer network both externally and internally, and then correlates that data to what is found inside a customer network from detection. This allows for a more proactive closing of vulnerabilities found in vulnerability scans. With some existing systems, when a scan is completed the customer is provided with a list of high-, medium-, and low-level vulnerabilities that were found. When that happens, the user or company will focus on closing or remediating the high-level vulnerabilities first, then the medium level ones, then the low-level ones. Attackers know this and will sometimes alter their attacks to compromise low- to medium-level threat attacks, which customers take longer to close. By correlating vulnerability scan data with network-detected threat data, host, and endpoint data, some systems implemented the present invention can assist companies in better prioritizing which threats to close and remediate first.

The term "computer-readable medium" herein encompasses non-transitory distribution media, intermediate storage media, execution memory of a computer, and any other medium or device capable of storing a computer program implementing a method for later reading by a computer.

When an act is described herein as occurring "as a function of" a particular thing, the system is configured so that the act is performed in different ways depending on one or more characteristics of the thing.

While the embodiments described above refer to hashes of files, configuration data, and other data, some embodiments replace each such instance with different kinds of characterization information that characterizes the data as will occur to those skilled in the art. For example, the characterization information might only include specific portions of a file, an encoding of certain configuration settings, or processed portions of user profiles, among other options that will occur to those skilled in the art in view of this disclosure.

The various communications referred to herein may be sent and received synchronously or asynchronously, using one- or two-way channels. Some embodiments will use the TCP/IP protocols, while other will use UDP over IP, and still others will use different techniques as will occur to those skilled in the art in view of this disclosure.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A network monitoring system comprising a processor, a network interface, and a memory having an encrypted portion and an unencrypted portion, the unencrypted portion being encoded with programming instructions executable by the processor to:
- create one or more hashes of at least some information stored in the unencrypted portion of the memory;
- send the one or more hashes to a remote computer;
- receive a response from the remote computer; and
- if the response is of a first type, then
  - use information in the response to decrypt the encrypted portion of the memory; and
  - use information from the encrypted portion of the memory to capture and process data using the network interface.

2. The network monitoring system of claim 1, wherein the programming instructions are further executable by the processor to, if the response is of a second type, erase the encrypted portion of the memory.

3. The network monitoring system of claim 1, wherein the programming instructions are further executable by the processor to flag dangerous content using filtering information in the encrypted portion of the memory.

4. The network monitoring system of claim 3, wherein the filtering information used to flag the dangerous content comprises at least one profile selected from a profile set consisting of:
- a client profile comprising information that characterizes at least one of expected content and unexpected content for a user of the network monitoring system; and
- an industry profile comprising information that characterizes at least one of expected content and unexpected content for a generic user who operates in a particular industry, where the user of the network monitoring system operates in the particular industry.

5. The network monitoring system of claim 3, wherein the programming instructions are further executable by the processor to:
- open flagged content in a sandbox;
- collect intelligence regarding behavior of the flagged content as it is opened in the sandbox; and
- store the intelligence in the encrypted portion of the memory.

* * * * *